US008005954B2

(12) United States Patent
Batz et al.

(10) Patent No.: US 8,005,954 B2
(45) Date of Patent: Aug. 23, 2011

(54) SYSTEM AND METHOD FOR MANAGING END USER APPROVAL FOR CHARGING IN A NETWORK ENVIRONMENT

(75) Inventors: Robert M. Batz, Raleigh, NC (US); Louis F. Menditto, Raleigh, NC (US); John G. White, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 963 days.

(21) Appl. No.: 10/928,932

(22) Filed: Aug. 27, 2004

(65) Prior Publication Data

US 2006/0047814 A1 Mar. 2, 2006

(51) Int. Cl.
G06F 15/16 (2006.01)
(52) U.S. Cl. ......... 709/226; 709/203; 709/227; 709/229
(58) Field of Classification Search .................. 709/203, 709/226; 705/40, 39, 26
See application file for complete search history.

(56) References Cited

U.S. PATENT DOCUMENTS

| 5,602,907 | A | | 2/1997 | Hata et al. ...................... 379/114 |
|---|---|---|---|---|
| 5,822,411 | A | | 10/1998 | Swale et al. ................... 379/111 |
| 5,828,737 | A | | 10/1998 | Sawyer .......................... 379/114 |
| 5,905,736 | A | | 5/1999 | Ronen et al. ................... 370/546 |
| 5,909,238 | A | | 6/1999 | Nagashima et al. .............. 348/3 |
| 5,946,670 | A | | 8/1999 | Motohashi et al. ............ 705/400 |
| 5,956,391 | A | | 9/1999 | Melen et al. ................... 379/114 |
| 5,970,477 | A | | 10/1999 | Roden .............................. 705/32 |
| 5,987,477 | A | * | 11/1999 | Schmuck et al. .............. 707/201 |
| 5,987,498 | A | | 11/1999 | Athing et al. ................... 709/203 |
| 6,016,509 | A | | 1/2000 | Dedrick ......................... 709/224 |
| 6,035,281 | A | | 3/2000 | Crosskey et al. ................ 705/14 |
| 6,047,051 | A | | 4/2000 | Ginzboorg et al. ........... 379/130 |
| 6,070,192 | A | | 5/2000 | Holt et al. ...................... 709/227 |
| 6,075,854 | A | | 6/2000 | Copley et al. .................. 379/211 |
| 6,131,024 | A | | 10/2000 | Boltz ............................. 455/405 |
| 6,141,684 | A | | 10/2000 | McDonald et al. ........... 709/222 |
| 6,175,879 | B1 | | 1/2001 | Shah et al. ..................... 709/330 |

(Continued)

FOREIGN PATENT DOCUMENTS

WO WO 98/26381 6/1998

(Continued)

OTHER PUBLICATIONS

"Notification of Transmittal of the International Search Report or the Declaration and Written Opinion of the International Searching Authority" in International Application Filing No. PCT/US05/27370 filed on Aug. 2, 2005 (16 pages), Mailed Feb. 21, 2007.

(Continued)

*Primary Examiner* — Kenny S Lin
*Assistant Examiner* — Sulaiman Nooristany
(74) *Attorney, Agent, or Firm* — Baker Botts L.L.P.

(57) ABSTRACT

An apparatus for managing information in a network environment is provided that includes a content service gateway operable to communicate with an end user in order to facilitate a communication session. The communication session relates to a request by the end user for content or for a service. A quota server coupled to the content service gateway is operable to receive a service authorization request from the content service gateway relating to the communication session. The service authorization request operates to authorize access to the service or to the content for the end user.

34 Claims, 2 Drawing Sheets

U.S. PATENT DOCUMENTS

| | | | |
|---|---|---|---|
| 6,208,977 B1 | 3/2001 | Hernandez et al. | 705/34 |
| 6,282,573 B1 | 8/2001 | Darago et al. | 709/229 |
| 6,295,447 B1 | 9/2001 | Reichelt et al. | 455/417 |
| 6,480,485 B1 | 11/2002 | Kari et al. | 370/352 |
| 6,611,821 B2 | 8/2003 | Stahl et al. | 705/400 |
| 6,665,537 B1 | 12/2003 | Lioy | 455/435 |
| 6,671,675 B2 | 12/2003 | Iwamura | 705/30 |
| 6,728,266 B1 | 4/2004 | Sabry et al. | 370/468 |
| 6,757,371 B2 | 6/2004 | Kim et al. | 379/114.22 |
| 6,970,933 B1 * | 11/2005 | Masters | 709/229 |
| 7,024,466 B2 * | 4/2006 | Outten et al. | 709/219 |
| 2001/0023428 A1 | 9/2001 | Miyazaki et al. | 709/201 |
| 2001/0046283 A1 * | 11/2001 | Bouffard et al. | 379/114.2 |
| 2002/0032649 A1 * | 3/2002 | Selvarajan | 705/40 |
| 2002/0059114 A1 | 5/2002 | Cockrill et al. | 705/27 |
| 2002/0132662 A1 * | 9/2002 | Sharp et al. | 463/25 |
| 2002/0138601 A1 | 9/2002 | Piponius et al. | 709/223 |
| 2003/0005118 A1 * | 1/2003 | Williams | 709/225 |
| 2004/0088349 A1 * | 5/2004 | Beck et al. | 709/203 |
| 2004/0193513 A1 * | 9/2004 | Pruss et al. | 705/30 |
| 2005/0044138 A1 * | 2/2005 | Albert et al. | 709/203 |
| 2005/0240520 A1 * | 10/2005 | Stura et al. | 705/39 |
| 2006/0178918 A1 | 8/2006 | Mikurak | 705/7 |
| 2008/0056494 A1 * | 3/2008 | Jacobson et al. | 380/255 |

FOREIGN PATENT DOCUMENTS

| | | |
|---|---|---|
| WO | WO 99/31610 | 6/1999 |

OTHER PUBLICATIONS

Online Inc., "Apogee Releases Content Usage-Based Billing Product Annotated Title—Software allows content usage-based billing," EContent, vol. 24, No. 5, NDN 173-0356-6509-7, 1 pg., Jul. 2001.

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg., Jun. 28, 2001.

Karsten Lüttge, "E-Charging API: Outsource Charging to a Payment Service Provider," NDN 174-0708-0924-8, pp. 216-227, 2001.

A. Herzberg, "Safeguarding Digital Library Contents: Charging for Online Content," D-Lib Magazine, NDN 174-0590-9051-8, 16 pgs., Jan. 1998.

Business Wire, "Apogee Networks Introduces Industry's First Content Usage-Based Billing Solution for Web Hosters," NDN 219-0281-6988-1, 2 pgs., May 8, 2001.

Business Wire, "Apogee Networks Announces Investment by Cisco Systems; Combined Efforts Enhance Billing Capabilities for Content Delivery Network Providers," NDN 219-0220-9035-0, 2 pgs., Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs., Oct. 10, 2000.

Business Wire, "Apogee Networks Unveils NetCountant Wireless Billing at SUPERCOMM; Company Demonstrates Industry First Wireless Content Usage Based Billing Solution," NDN 218-0324-8075-6, 2 pgs., Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs., Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs., Dec. 6, 2000.

Business Wire, "Apogee Networks Joins Content Alliance; Billing Expert to Join Industry Group Aimed at Advancing Content Networking," NDN 218-0181-2716-7, 3 pgs., Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs., Jun. 19, 2000.

Canadian Office Action for Application No. 2,576,803, "System and Method for Managing End User Approval for Charging in a Network Environment" dated May 6, 2009, 4 pages.

European Patent Office Communication, Supplementary European Search Report; Application No. 05778349.0-2221 / 1784740; Ref. P30056EP-PCT-IK dated Mar. 8, 2010 forwarded by foreign associate to Baker Botts on Sep. 15, 2010; 5 pages.

* cited by examiner

SYSTEM AND METHOD FOR MANAGING END USER APPROVAL FOR CHARGING IN A NETWORK ENVIRONMENT

TECHNICAL FIELD OF THE INVENTION

This invention relates in general to the field of communications and, more particularly, to a system and a method for managing end user approval for charging in a network environment.

BACKGROUND OF THE INVENTION

Data networking architectures have grown increasingly complex in communication systems and environments. Communication tunnels or connections may be used in order to establish or to gain access to a network, whereby an end user or an object may initiate a tunneling protocol by invoking a selected location or a network node. The network node or central location may then provide a platform that the end user may use to conduct a communication session.

As the subscriber base of end users increases and/or becomes mobile, proper routing and efficient management of communication sessions and data flows becomes even more critical. Some network equipment may provide particular content or a service for a given end user. However, in certain scenarios, an end user may not understand his financial obligation, which is about to be accepted. In other cases, an end user is systematically and repeatedly queried for his approval for a selected service or for desired content. Such operations may be redundant and bothersome for the end user, and be expensive for network operators. Thus, the ability to properly manage financial obligations or commitments for an end user in a convenient fashion presents a significant challenge to system designers, component manufacturers, and network operators.

SUMMARY OF THE INVENTION

From the foregoing, it may be appreciated by those skilled in the art that a need has arisen for an improved management approach associated with approving transactions before proceeding forward with the requested content or service. In accordance with one embodiment of the present invention, a system and a method for managing end user approval are provided that greatly reduce disadvantages and problems associated with conventional network access management techniques.

According to one embodiment of the present invention, there is provided an apparatus for managing information in a network environment that includes a content service gateway operable to communicate with an end user in order to facilitate a communication session. The communication session relates to a request by the end user for content or for a service. A quota server coupled to the content service gateway is operable to receive a service authorization request from the content service gateway relating to the communication session. The service authorization request operates to authorize access to the service or to the content for the end user.

Certain embodiments of the present invention may provide a number of technical advantages. For example, according to one embodiment of the present invention a communications approach is provided that offers an inexpensive solution, which addresses the problem of consistently querying an end user for a selected service or for desired content. Consider that querying a quota server for every network transaction is expensive. Once the quota server realizes the user has been approved for the selected content or service, the quota server of the present architecture can request a discontinuation of per-transaction notifications. Hence, in the preferred architecture the quota server is not subsequently burdened with continuous re-authorizations. This would allow an end user to purchase access to a service or content and be allowed to consummate a single transaction. This avoids the issue of having to be asked repeatedly to purchase the selected commodity (i.e. the selected content or level of service).

The present architecture is malleable in that it may be implemented in any number of arrangements, using a standard web server (i.e. the server that includes the desired content) to achieve its intended result. The web server can be used to seek approval from the end user before proceeding forward with the requested data exchange. As identified above, since the uniform resource locator (URL) can be used to pass the approval information, no back-end communication protocol is required between the quota server and the web server.

Yet another technical advantage associated with one embodiment of the present invention relates to confirmation features being provided to an end user. An end user may be properly notified of how much his account will be charged for the selected content or service. This would further ensure that a given end user understands and, further, appreciates the obligations being displayed or offered. Moreover, the elements within the network may cooperate in order to confirm service prices for selected access for designated information before the end user receives the requested data. Thus, the architecture provided may be used to effectively execute per-transaction authorization for an end user. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
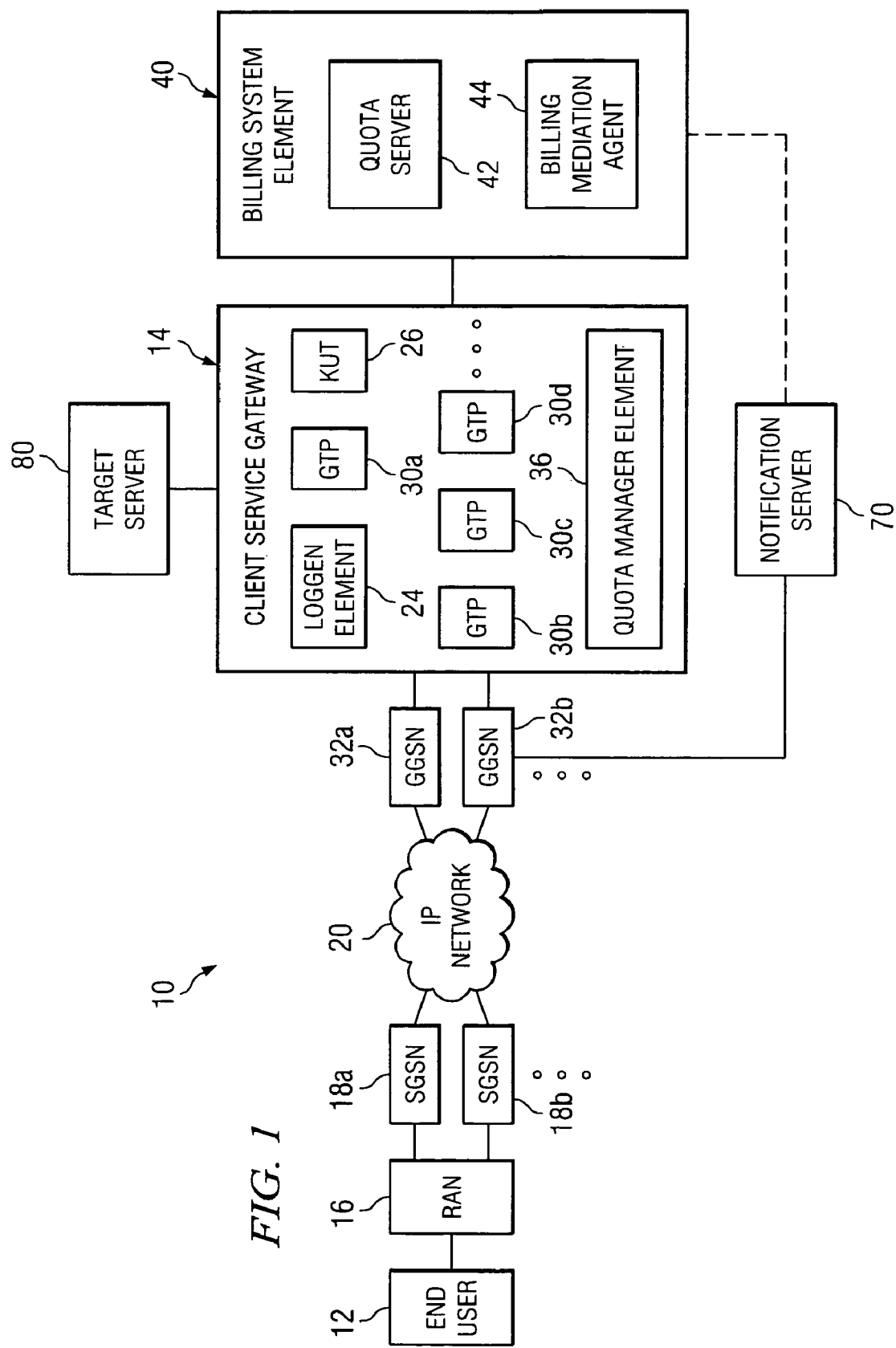
FIG. 1 is a simplified block diagram of a communication system for managing end user approval of network resources in accordance with one embodiment of the present invention.

FIG. 1 is a simplified block diagram of a communication system 10 for managing approval for access to selected network resources such as desired content or services. Communication system 10 may include an end user 12, a content service gateway (CSG) 14, a radio access network (RAN) 16, multiple serving general packet radio service (GPRS) support nodes (SGSN) 18a and 18b, and an Internet protocol (IP) network 20. Additionally, communication system 10 may include multiple gateway GPRS support nodes (GGSNs) 32a-b. In addition, CSG 14 may include a loggen element 24, a known user table (KUT) 26, multiple GPRS tunneling protocol (GTP) communications protocol elements 30a-d that facilitate communications between CSG 14 and any billing entity within communication system 10, and a quota manager element 36. Communication system 10 may additionally include a billing system element 40 that may include a quota server 42 and a billing mediation agent (BMA) 44. Communication system 10 may also include a notification server 70 and a target server 80, which may include content or services sought by end user 12. Notification server 70 may be coupled to any of the GGSNs (as any communications between notification server 70 and the client would have to be tunneled between SGSNs and GGSNs) and/or billing system element 40, as explained more fully below.

Communication system 10 may be generally configured or arranged to represent 2.5 G communication architecture applicable to a Global System for Mobile (GSM) environment in accordance with a particular embodiment of the present invention. Communication system 10 may also be configured to reflect a version of any suitable GPRS tunneling protocol. Communication system 10 may additionally cooperate with first generation, 2G, and 3G architectures that provide some configuration for allocating data to an end user in a network environment. Communication system 10 may also be employed in any other suitable communication architecture that seeks to allocate or otherwise manage data or information in a network environment.

In accordance with the teachings of the present invention, communication system 10 operates to query end user 12 for approval on a per-transaction basis before charging for access to a given service or for desired content. CSG 14 parses IP packets transmitted between a user (i.e. a client) and target server 80. For selected flows and for selected clients, a billing system can debit a user account based on the type and the amount of information forwarded. The user may be queried for approval (before charging the user's account) for access to a service that represents a set of chargeable flows. An end user is provided with the opportunity to authorize a payment decision at the service level (e.g. billing for a set of transactions). In the context of content services, when an end user first accesses given content, he may be asked to approve the initial transaction before progressing to the desired location (or service being offered) in the network. Subsequent services may then be provided or approved without having to reengage the end user. Thus, the end user does not have to be continuously queried once the service approval is established.

CSG 14 may implement prepaid service processing, whereby quota acquisition from quota server 42 is executed via service authorization requests and via service re-authorization requests. This CSG configuration is further enhanced by using new primitives to enable user approval before charging a corresponding end user account. Two new primitives may be introduced for the billing system.

The first primitive is a service verification request, which reflects a primitive sent by CSG 14 to quota server 42 for L3/L4/L7 requests until quota server 42 designates a cease or a stoppage of such requests. The verification request may include, for example, user information, service information, IP protocol, IP addresses, and L4 ports (if the IP protocol is transmission control protocol (TCP) or user datagram protocol (UDP)). It may also include L7 information such as the uniform resource locator (URL) and hostname in hyper text transfer protocol (HTTP) or in wireless application protocol (WAP) headers.

The second primitive is a service verification response, which can be sent by quota server 42 to CSG 14. This can be used to instruct CSG 14 on how to handle the flow associated with the service verification request. Quota server 42 can instruct CSG 14 to drop the flow, forward the flow, perform a network address translation (NAT) redirect, or to perform a redirect to a URL. The NAT and URL information can be specified in the service verification response. The service verification response can be used to instruct CSG 14 to stop sending service verification requests for this end user and for this service, i.e. once the user has approved charging for this service. The service verification response can also be used to grant quota for this user for the requested service. Additional details relating to this messaging and to these operations are provided below with reference to FIG. 2.

Note that the architecture of communication system 10 offers an inexpensive solution to the problem of needing repetitious end user approval for transactions that have already been authorized. Querying quota server 42 for every transaction is expensive and consumes resources. However, in the proffered architecture, once quota server 42 realizes the user has been approved for the selected content or service, quota server 42 can request a discontinuation of per-transaction notifications. Hence, quota server 42 does not need to be subsequently burdened with continuous re-authorizations. This allows end user 12 to purchase access to a service via a single transaction.

Note also that the arrangements of the elements within CSG 14 and billing system element 40 are arbitrary and have been offered only as just one (amongst many) potential configurations to be used to execute the operations of communication system 10 as described herein in this document. Because these elements may be provided in software, hardware, or in any other module, component, device, or object, they may be combined (or provided externally) where appropriate and based on particular needs. Considerable flexibility is provided by these elements in that they may be arranged in any suitable manner and communicate with one another in various ways. The embodiment of FIG. 1 is only an example used for purposes of teaching and, accordingly, should be construed as such. Additional details relating to the functionality and operations of these elements are provided below with reference to the schematic of FIG. 2.

End user 12 is a client, customer, entity, source, or object seeking to initiate a network communication in communication system 10 via IP network 20. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of packet, numeric, voice, video, graphic, or script data, or any type of source or object code, or any other suitable information in any appropriate format that may be communicated from one point to another.

RAN 16 is a communications interface between end user 12 and SGSNs 18a and 18b. RAN 16 may comprise a base transceiver station and a base station controller in one embodiment. The communications interface provided by RAN 16 may allow data to be exchanged between end user 12 and any number of selected elements within communication system 10. RAN 16 may facilitate the delivery of a request packet generated by end user 12 and the reception of information sought by end user 12. RAN 16 is only one example of a communications interface between end user 12 and SGSNs 18*a* and 18*b*. Other suitable types of communications interfaces may be used for any appropriate network design and be based on specific communications architectures in accordance with particular needs.

SGSNs 18*a* and 18*b* and GGSNs 32*a* and 32*b* are communication nodes or elements that cooperate in order to facilitate a communication session involving end user 12. GGSNs 32*a-b* are communications nodes operating in a GPRS environment that may be working in conjunction with multiple SGSNs 18*a* and 18*b* to provide a communications medium in a GPRS service network.

When end user 12 changes between SGSN 18*a* and 18*b*, the change may be communicated to CSG 14 by any appropriate node such as a selected GGSN 32*a* or 32*b*. This could be effectuated by a remote access dial-in user service (RADIUS) accounting message via a start signal or an interim update signal. This could also be reflected in a vendor-specific attribute that indicates the new SGSN being different from the current SGSN being used by end user 12. That message may also be communicated to billing system element 40 indicating the change in SGSN. The change in SGSN may result in quota data being returned to billing system element 40 for this particular flow (e.g. prepaid content being returned to an account associated with end user 12). Pricing may vary for prepaid content depending on the geographic position of end user 12, roaming off network, or which SGSN is currently being implemented. Additionally, for example, pricing may also be distinguished based on a given fee structure such as pricing per download, pricing per byte, or pricing for a selected time interval. Alternatively, any other parameter may be used in order to vary billing rates provided for a given end user 12. A selected GGSN 32*a* or 32*b* may report the change in SGSN by end user 12 via RADIUS messaging. Alternatively, this signaling may be provided by any data exchange or architecture in any suitable communication standard or protocol in accordance with particular needs.

IP network 20 represents a series of points or nodes of interconnected communication paths for receiving and transmitting packets of information that propagate through communication system 10. IP network 20 offers a communicative interface between end user 12 and selected GGSNs 32*a-b* and may be any local area network (LAN), wireless local area network (WLAN), metropolitan area network (MAN), wide area network (WAN), virtual private network (VPN), or any other appropriate architecture or system that facilitates communications in a network environment. IP network 20 may implement a UDP/IP connection and use a TCP/IP communication language protocol in particular embodiments of the present invention. However, IP network 20 may alternatively implement any other suitable communication protocol for transmitting and receiving data packets within communication system 10.

CSG 14 is a network element that may be inserted into a data flow and that may view, extract, identify, access, or otherwise monitor information included within the data flow. CSG 14 may handle the enforcement of access, quota distribution, and accounting that is provided by the information retrieved from elements included within billing system element 40. CSG 14 may generally deduct quota after it has been properly allocated and, subsequently, retrieve additional quota when that quota allocation has been consumed. In a general sense, CSG 14 may be responsible for quota enforcement for end user 12. CSG 14 may include any suitable software, hardware, components, modules, devices, elements, or objects to facilitate the operations thereof.

In operation of an example embodiment, CSG 14 may extract IP source address information associated with end user 12. The IP source address may be used to determine an identity (or profile) of end user 12 that may be stored in KUT 26. Alternatively, CSG 14 may extract or identify any information within the data flow that provides a correlation between end user 12 and a given data flow. CSG 14 may also be a client-aware device that provides or offers some service or feature to end user 12. Such services may be based on an effective mapping between a source IP address of a given address packet and a user profile or information associated with end user 12. CSG 14 may utilize a source IP address in providing services or features to end user 12. CSG 14 may include a RADIUS component that may receive RADIUS messages and parse the messages. In addition, CSG 14 may execute some action based on the RADIUS messages it receives. CSG 14 may be provided with accounting, authorization, and authentication (AAA) capabilities where appropriate. Alternatively, these capabilities may be provided external to CSG 14, for example, in an AAA server.

There are other reasons why a device or a component may seek to identify the source (end user 12) associated with a communication session or data flow. For example, some devices may wish to identify end user 12 for authorization purposes. In another example, a device may wish to maintain user profiles for billing or accounting records (for example, in conjunction with per-user accounting) or to provide for content billing information. Alternatively, a device or a component may use the identification of end user 12 to provide for any other type of suitable client-aware service, tool, or feature according to the particular needs of network operators. Additional services may be related to areas such as routing, permissions or access-granting mechanisms, priority, quality of service (QoS), firewalling, content filtering, or any other suitable parameters or policies where user-aware characteristics serve as a basis for a network service implementation.

In an example scenario illustrating the operational capabilities of CSG 14, consider end user 12, who may have a communication session established with SGSN 18*a*, whereby a certain amount of money from an account of end user 12 is translated into a download of a given number of bytes. When end user 12 moves to SGSN 18*b*, end user 12 may be permitted to download a different number of designated bytes for the same amount of money or billing rate. The SGSN change may be detected by GGSN 32*a* or 32*b*, whereby the selected GGSN communicates an accounting update to CSG 14. CSG 14 may then return all downloaded quota for end user 12 and notify billing system element 40 of the change in SGSN. CSG 14 may also communicate an acknowledgement to the selected GGSN for the message provided thereto. CSG 14 may then download the appropriate quota information for end user 12 again. This information may be retrieved from quota server 42 or alternatively from any other suitable database or storage element provided within billing system element 40 or provided external thereto. Billing system element 40 may be aware of the location change and send quota information to CSG 14 based on new financial parameters or new tariff characteristics that apply to the new location or the change in network parameters.

Loggen element 24 is a storage element operable to build billing records and communicate the billing records to BMA 44 based on information provided by KUT 26. Even in cases where the information returned by KUT 26 reflects a null (e.g., no active BMA), this may be communicated to GTP element 30*a*, which may use the value to determine the destination and queue(s) to use or to invoke for a corresponding billing record. Loggen element 24 may also operate to store data for later use and execute all formatting for billing records to be communicated to BMA 44. Loggen element 24 may be implemented using hardware, software, or any other suitable element or object operable to store information and to generate a billing record to be communicated to BMA 44. Loggen element 24 may communicate with BMA 44 in order to log quota usage data associated with end user 12. Loggen element 24 may generate logging records or billing records and additionally send messages to billing system element 40 associated with a change in SGSN.

KUT 26 is a data storage element that manages one or more correlations between the ID of end user 12 and a corresponding IP address. KUT 26 may also store information relating to BMA 44, previously designated to end user 12, and BMA 44 may be invoked when additional information associated with end user 12 is communicated to CSG 14. KUT 26 may be consulted as additional billing records are created in order to determine that BMA 44 should receive selected billing records. KUT 26 may also include an application program interface (API) that may be implemented in order to obtain user ID information for an IP address from a data flow.

KUT 26 is provided with the capability of mapping the source IP address (or any other end user 12 parameter) to a user ID. The user ID may be obtained from an external database where appropriate or any other suitable location. Alternatively, the user ID may be extracted from a RADIUS flow, a terminal access controller access control system (TACACS) communications flow, a diameter communications flow, or any other suitable communications protocol flow, communication session, or data exchange. The database may be populated at any suitable time and updated using any suitable mechanism, such as via the sniffing of RADIUS or TACACS flows.

CSG 14 and billing system element 40 may implement any suitable communications protocol in order to exchange information. In an example embodiment, GTP elements 30a-d may be used as a communications protocol or a platform for such communications. Alternatively, CSG 14 and billing system element 40 (or BMA 44) may implement any appropriate communications protocol or tunneling communication link in order to provide for a suitable data exchange. GTP elements 30a-d may be included in CSG 14 or provided external thereto and be GTP or non-GTP based where appropriate. In one embodiment, GTP elements 30a-d are software communication protocols that describe the acknowledgement (or ACKing) and handshaking operations that allow recognition of active, operational, and disabled states associated with BMA 44. In addition, GTP elements 30a-d may facilitate the formatting, header information, sequencing, and other communication parameters in order to effectively deliver data or information between CSG 14 and BMA 44.

In operation of an example embodiment, a packet may be delivered to CSG 14. The first packet in the data flow may be associated with end user 12 and analyzed by CSG 14. CSG 14 may operate to save selected data and (depending on whether it is an HTTP request or a non-HTTP request) suitably discard other information. In the case where the data flow does not include an HTTP request, CSG 14 may simply retain certain information about the data flow and potentially save that information until the flow ends. Where an HTTP request is made, information may exist that is provided by a browser and additional information may be offered about the URL, which may be used by CSG 14. In addition, information about which location in the network end user 12 is attempting to access may also be used by CSG 14. CSG 14 may perform a sniffing operation in this sense and glean information from packets included within a data flow. Other information to be extracted from HTTP requests or non-HTTP requests may include source and destination address information, how long the communication session lasted, how many bytes were sent or received by end user 12, or any other suitable parameters or properties associated with end user 12, the location to be accessed, or the data flow initiated by end user 12.

A billing record may then be created within CSG 14 and sent to BMA 44. A look-up operation may then be performed in order to correlate the IP address of end user 12 in KUT 26 to the user ID that may be included in that billing record. With this information provided, BMA 44 may now be assigned for this end user (if end user 12 is a new user). If this information or data flow is associated with an existing end user 12, it may be determined that BMA 44 was previously used by end user 12.

Quota manager element 36 is an element that manages quota information for services subscribed to by end user 12. Quota manager element 36 also provides an interface between GGSNs 32a and 32b and billing system element 40 and may receive a communication that indicates a change in SGSN. Quota manager element 36 may also identify new and old identifiers or pointers for selected SGSNs involved in the communication session and notify billing system element 40. Quota manager element 36 may also communicate with billing system element 40 in order to exchange information associated with funding for end user 12. Quota manager element 36 may also receive RADIUS updates from GGSN 32a or 32b that reflect the current status associated with end user 12.

Billing system element 40 is an object that manages the billing and access policies associated with a given end user 12. CSG 14 may communicate with billing system element 40 in order to retrieve information or to learn of billing policies for end user 12. Quota server 42 may handle the service verification request that is used for end user 12 to receive any portion of requested content. A token mechanism could be implemented to achieve this result. Such token mechanisms, as well as the operations and processes associated with the elements included within billing system element 40, are described below with reference to FIG. 2.

Notification server 70 is a processor, server, or a database that is operable to provide some sort of dialogue or communication with end user 12 such that billing information is provided to end user 12. This could include user-friendly "pop-up screens" or any other data segment that provides charging or billing information to end user 12. End user 12 can then be given the prerogative to decline or to accept the tendered financial terms. Notification server 70 may include any suitable element, hardware, software, or any appropriate object that facilitates the operations thereof. Notification server 70 may be coupled to IP network 20 or communicate with end user 12 via any other suitable entity.

Note that communications between notification server 70 and billing system element 40 (or quota server 42) may be provided by a proprietary protocol that facilitates data exchanges between the two. This is illustrated in FIG. 1 by a dashed line between notification server 70 and billing system element 40. This would allow quota server 42 to allow traffic to pass through to end user 12 after end user 12 has approved the proposed financial terms. Such back channel operations could be substituted by other suitable protocols that would facilitate the delivery of content to end user 12.

Target server 80 is a website offering content or services to any end user 12 or group of clients. For example, target server 80 could be www.ESPN.com or www.yahoo.com, both of which offer enhanced content to their end users. Alternatively, target server 80 can be any destination, location, or node that is sought to be accessed or used by end user 12. Target server 80 may provide the requested service/content, or provide a portal, pathway, or gateway to another location that includes the desired commodity. In other embodiments, target server 80 could simply be a database or a processor that can store or deliver content or services to one or more end users 12.

Note that because certain enhancements should be made to several network components to achieve the targeted signaling and data exchanges of the present invention, it is critical to explain their internal structures. In a particular embodiment of the present invention, CSG 14, and/or quota server 42 may include software that is operable to facilitate appropriate signaling for any interested piece of network equipment or for any appropriate network location. CSG 14, quota server 42, and notification server 70 can handle per-transaction authorization with content authorization support. CSG 14 and quota server 42 modifications for service verification include supporting the new service verification messages and functions. The augmentation or enhancement (via software) may be provided in just one of these elements, in two elements, or in all three elements. Such design choices may be based on particular networking or configuration needs. Alternatively, this augmentation (providing a signaling capability) may be provided by any suitable hardware, component, device, application specific integrated circuit (ASIC), field-programmable gate array (FPGA), micro-processor, read only memory (ROM) element, random access memory (RAM) element, erasable programmable ROM (EPROM), electrically erasable programmable ROM (EEPROM), processor, algorithm, element or object that is operable to perform such operations. Note that such a signaling functionality may be provided external to GGSN 32a or 32b, CSG 14, and/or quota server 42 allowing appropriate accounting to be achieved for interested components in the network.

The present architecture may also be implemented in any number of arrangements, using a standard web server (i.e. target server 80 that includes the desired content) to achieve its result. The web server can be used to ask for approval from the end user before proceeding forward with the transaction. In addition, because the URL is used to exchange the approval information, back-end communication protocols are not necessary, as between quota server 42 and target server 80.

The present architecture also offers enhanced confirmation features that are being provided to an end user on a per-transaction basis. An end user may be properly notified how much his account will be charged for the selected content. This would further ensure that a given end user understands and, further, accepts the obligations being displayed or offered. Moreover, the elements within billing system element 40 may cooperate in order to confirm service prices for selected access or for designated information before the end user receives the requested data.

Figure 2:
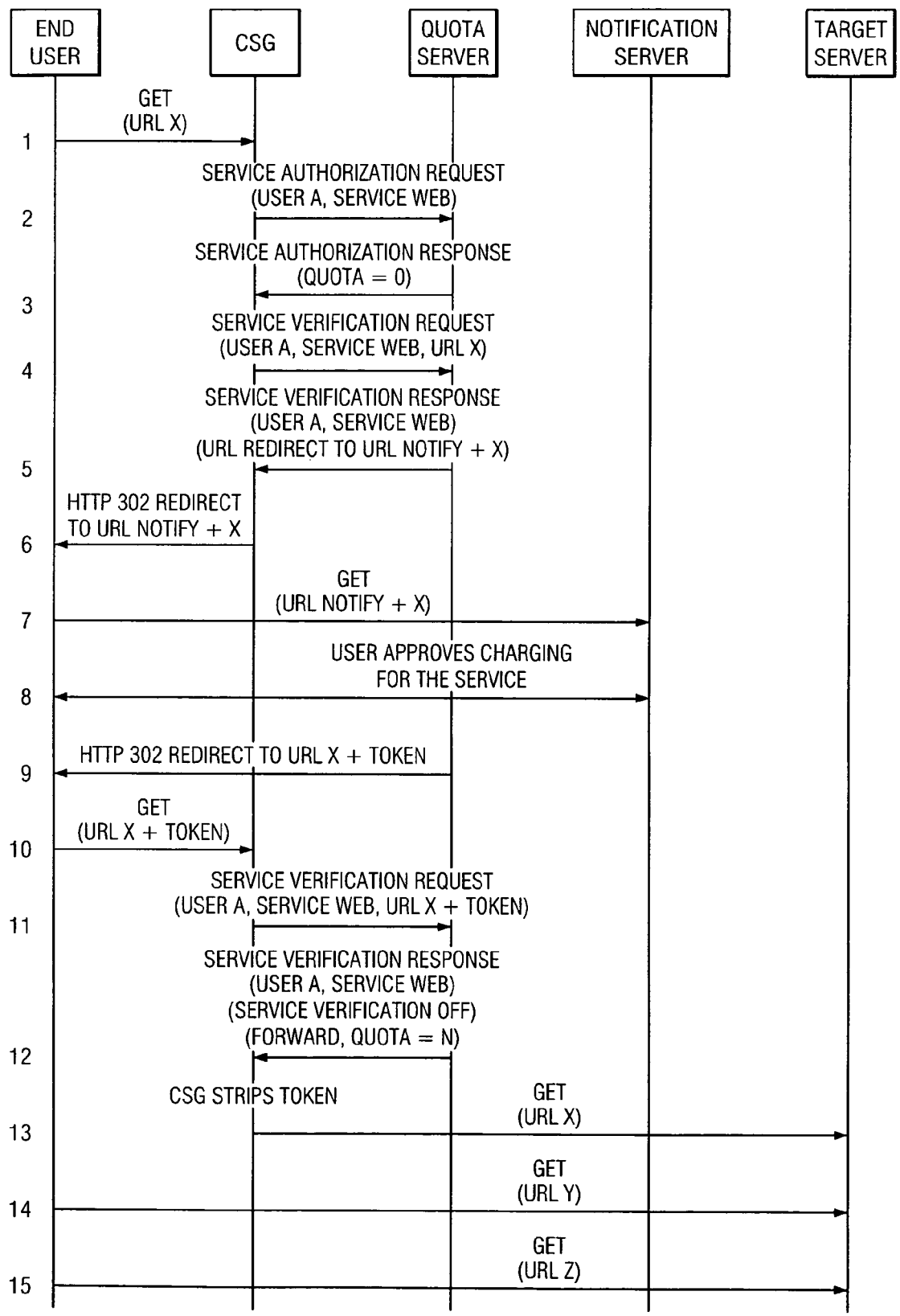
FIG. 2 is a simplified flowchart illustrating an example operation associated with the communication system.

FIG. 2 is a simplified flowchart that offers an example of how the service verification request and the service verification response primitives can be used within the architecture of CSG 14 to enable user approval for charging. At step 1, end user 12 may request content from target server 80. This request may be in the form of a simple URL 'GET' such that a given URL (e.g. 'X') is identified. The request is properly received by CSG 14, which evaluates the request. A service authorization request may then be made at step 2 such that quota can be delivered for end user 12. This quota request operates to request authorization for access to a service or to content. Quota server 42 may be informed of the identity of end user 12 (i.e. 'end user A' in this example) and which service is to be billed. In this example, quota server 42 determines that end user 12 does not have any available quota and, thus, responds to the request with a service authorization (auth) response, which indicates that the quota=0. This is illustrated by step 3. Further, in this example, quota server 42 responds by prohibiting the release of quota until end user 12 agrees to pay for it.

At step 4, CSG 14 may communicate a service verification request to quota server 42. In this example, this includes the identity of end user 12, the service that was requested, and the content that was requested. Quota server 42 may reference a table or a record and determine that end user 12 has not previously agreed to pay for this item. This would then result in a redirection, which is illustrated by step 5. At step 6, the illustrated '302' notation is just an HTTP return code provided in this example flow. It indicates to the browser that the browser needs to issue a new request. The redirect can specify the URL, which is sought to be accessed by end user 12. Hence, the redirect includes the address of notification server 70 plus the originally requested URL ('X'). CSG 14 may simply pass this message onto the client (i.e. end user 12) at step 6. Once the browser sees the redirect, at step 7, it issues a new request to notification server 70. Within this request is the IP address of notification server 70 and the originally requested URL. At this point, there is an exchange between end user 12 and notification server 70 about payment or charging. This may include a pop-up screen or a simple text message that is exchanged.

At step 8, end user 12 can decline or approve the billing for the service, content, etc. This could include any number of arrangements and implementations. For example, a secure connection may be provided such that credit card information may be input by end user 12. This data exchange may pass through CSG 14. This example assumes that CSG 14 does not further charge end user 12 for the data flow, which is propagating through CSG 14. At step 9, notification server 70 then sends the redirect, which includes the originally requested URL plus a token. The token represents an appended state, which reflects that end user 12 has agreed to the billing. At step 10, end user 12 reissues the URL GET request with the token. Note that this could simply be done with a browser such that an actual end user is not required to perform this operation. Thus, with simple redirects, no end user interaction is necessarily solicited or required. When a browser sees the 302 code, it can respond by requesting a new URL.

At step 11, CSG 14 blindly passes the modified URL (with the token) to quota server 42 in the service verification request. CSG 14 has no knowledge about the end user's decision to pay. Quota server 42 recognizes the token and understands it to mean payment is authorized. Quota server 42 uses this information to update its tables and returns an appropriate amount of quota and a forward response directing CSG 14 to allow the request to pass. Upon receiving the forward action, CSG 14 notes that the URL contains the special token and removes it from the URL before forwarding the request. At step 12, quota server 42 responds to the request with quota such that the transaction can be executed. In addition, the response may include a forward action, which indicates the request is to be turned ON in this example. Also, in this example, service verification is turned OFF (i.e. service verification requests are not going to be issued for this end user accessing this service). Once it identifies the forward indication, CSG 14 can remove the token, which includes the payment decision, and then forward the original request to target server 80 at step 13. Steps 14 and 15 illustrate the ability of end user 12 to now repeatedly access selected content or services without having to be reauthorized by any element. Thus, once end user 12 receives his allotment of quota and is duly authorized, he may now be able to freely access selected information in subsequent requests. After step 15, CSG 14 can remain in the flow pathway such that data passing through CSG 14 may be metered. This would allow CSG 14 to debit a user account (e.g. per byte, per time increment, etc.).

In an alternative embodiment, URL-rewriting may be supplanted by a simple direct connection between notification server 70 and billing system element 40. This is illustrated by the dashed line of FIG. 1. Thus, the operation would generally be the same in allowing end user 12 to only be authorized a single time, after which time, he would be permitted to access additional content, services, etc.

Some of the steps illustrated in FIG. 2 may be changed or deleted where appropriate and additional steps may also be added to the flowchart. These changes may be based on specific communication architectures or particular interfacing arrangements and configurations of associated elements and do not depart from the scope or the teachings of the present invention. The interactions and operations between the elements within billing system element 40, CSG 14, and notification server 70 as disclosed in FIGS. 1-2, have provided merely some examples for their potential applications. Numerous other applications may be equally beneficial and selected based on particular networking needs.

Although the present invention has been described in detail with reference to particular embodiments, communication system 10 may be extended to any scenario in which end user 12 is provided with financial decisions in the context of a wired or a wireless connection or coupling. This may also be extended to any other network architectures and include communications with some type of access server (e.g. a network access server (NAS), foreign agents, etc.). End user 12 may use a dedicated connection of some form or use forms of multiple access protocols where appropriate. Access may be associated with a point to point protocol (PPP) architecture or alternatively with layer three protocols over a layer two protocol in accordance with particular needs. Moreover, significant flexibility is provided by communication system 10 in that any suitable one or more components may be replaced with other components that facilitate their operations. For example, RAN 16 and SGSNs 18*a* and 18*b* may be replaced by an access network or by a packet data serving node (PDSN). Additionally, GGSNs 32*a* and 32*b* may be replaced by a home agent or a NAS where appropriate.

Note also that the architecture of communication system 10 may readily be used in conjunction with HTTP or WAP configurations (both of which use a redirect feature). Both of these represent implementations involving layer-seven. However, the teachings of communication system 10 may also be provided in layer-four protocols (e.g. UDP or TCP). Such protocols may include redirect features (or redirect NATs) or be provided with other mechanisms that do not include redirect mechanisms. Such permutations are clearly within the broad scope of communication system 10.

Additionally, although communication system 10 has been described with reference to a number of elements (e.g. CSG 14, billing system element 40, and notification server 70, etc.) these elements may be rearranged or positioned anywhere within communication system 10. In addition, these elements may be provided as separate external components to communication system 10 where appropriate. The present invention contemplates great flexibility in the arrangement of these elements as well as their internal components. For example, in an alternative embodiment CSG 14 may include billing system element 40 or BMA 44 or these elements may be provided in a single module. Moreover, although FIG. 1 illustrates an arrangement of selected elements, such as CSG 14 inclusive of quota manager element 36, loggen element 24, or GTP elements 30*a-d*, numerous other components may be used in combination with these elements or substituted for these elements without departing from the teachings of the present invention. Also, CSG 14 may be positioned in any suitable point of a data flow such that it may extract information used for generating a billing record.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for managing information in a network environment, comprising:
    a content service gateway coupled to a hardware storage memory, operable to:
    send one or more service verification requests corresponding to one or more end user requests by an end user for content or for a service in a communication session, the service verification requests sent to a quota server to request a service verification during which the quota server determines that the end user has agreed to pay for a quota of the service or the content;
    inform the quota server of an identity of the end user and the service or the content that is to be billed to the end user via a service authorization;
    receive a service verification response from the quota server, the service verification response indicating the quota and comprising an instruction to stop sending a subsequent service verification request to the quota server;
    turn off the service verification in response to the instruction of the service verification response to stop sending a subsequent service verification request to the quota server for service or content in the communication session;
    receive a second end user request for additional service or content; determine that the quota cover the additional service or content; and allow the end user to access the additional service or content according to the second user request without sending a subsequent request to the quota server for service or content in the communication session.

2. The apparatus of claim 1, the content service gateway operable to:
    inform the quota server of an identity of the end user and the service or the content that is to be billed to the end user via a service authorization.

3. The apparatus of claim 1, the content service gateway operable to:
    receive a service authorization response that indicates a level of quota associated with the end user, the quota not released until the end user agrees to pay for the quota.

4. The apparatus of claim 1, a service verification request to the quota server including an identity of the end user and the service or the content that was requested.

5. The apparatus of claim 1, the content service gateway operable to:

communicate a redirect message to the end user, the redirect message generated in response to determining that the end user has not previously agreed to pay for the content or for the service.

6. The apparatus of claim 1, the content service gateway further operable to:
send a redirect message that specifies a location that is sought to be accessed by the end user and an address of a notification server.

7. The apparatus of claim 1, the content service gateway operable to:
receive an additional redirect message comprising:
the content or the service that was requested by the end user, and
a token indicating that the end user has agreed to proposed billing associated with the content or the service.

8. The apparatus of claim 1, the quota server operable to:
recognize that the end user has agreed to pay for the content or the service, and
send a response that includes the quota, which allows the communication session to be facilitated.

9. The apparatus of claim 1, the content service gateway operable to:
receive a forward action from the quota server, the forward action resulting in the end user being permitted to access the content or the service.

10. The apparatus of claim 1, wherein the content service gateway is operable to remove a token from an end user request, the token indicating that the end user has agreed to billing associated with the content or the service.

11. The apparatus of claim 1, the content service gateway operable to:
allow the end user to access selected information in one or more subsequent requests after having been authorized for the content or the service.

12. The apparatus of claim 1, the content service gateway operable to:
communicate with a billing system element in order to manage distribution of the quota provided to the end user.

13. The apparatus of claim 1, wherein access to the service or to the content is granted for the end user on a per-service basis such that the end user is not queried for subsequent authorizations for the communication session.

14. A method for managing information in a network environment, comprising:
sending, by a content service gateway, send one or more service verification requests corresponding to one or more end user requests by an end user for content or for a service in a communication session, the service verification requests sent to a quota server to request a service verification during which the quota server determines that the end user has agreed to pay for a quota of the service or the content;
informing the quota server of an identity of the end user and the service or the content that is to be billed to the end user via a service authorization;
receiving a service verification response from the quota server, the service verification response indicating the quota and comprising an instruction to stop sending a subsequent service verification request;
turning off the service verification in response to the instruction of the service verification response to stop sending a subsequent service verification request to the quota server for service or content in the communication session;

receiving, at the content service gateway, a second end user request for additional service or content;
determining that the quota covers the additional service or content; and
allowing the end user to access the additional service or content according to the second end user request without sending a subsequent request to the quota server for service or content in the communication session.

15. The method of claim 14, further comprising:
receiving a service authorization response that indicates a level of quota associated with the end user, the quota not released until the end user agrees to pay for the quota.

16. The method of claim 14, a service verification request to the quota server including an identity of the end user and the service or the content that was requested.

17. The method of claim 14, further comprising:
communicating a redirect message to the end user, the redirect message generated in response to determining that the end user has not previously agreed to pay for the content or for the service.

18. The method of claim 14, further comprising:
sending a redirect message that specifies a location that is sought to be accessed by the end user and an address of a notification server.

19. The method of claim 14, further comprising:
receiving an additional redirect message comprising:
the content or the service that was requested by the end user, and
a token indicating that the end user has agreed to proposed billing associated with the content or the service.

20. The method of claim 14, wherein access to the service or to the content is granted for the end user on a per-service basis such that the end user is not queried for subsequent authorizations for the communication session.

21. A system for managing information in a network environment, comprising:
means for sending, by a content service gateway, one or more service verification requests corresponding to one or more end user requests by an end user for content or for a service in a communication session, the service verification requests sent to a quota server to request a service verification during which the quota server determines that the end user has agreed to pay for a quota of the service or the content;
means for informing the quota server of an identity of the end user and the service or the content that is to be billed to the end user via a service authorization;
means for receiving a service verification response from the quota server, the service verification response indicating the quota and comprising an instruction to stop sending a subsequent service verification request to the quota server;
means for turning off the service verification in response to the instruction of the service verification response to stop sending a subsequent service verification request to the quota server for service or content in the communication session;
means for receiving, at the content service gateway, a second end user request for additional service or content;
means for determining that the quota covers the additional service or content; and
means for allowing the end user to access the additional service or content according to the second end user request without sending a subsequent request to the quota server for service or content in the communication session.

22. The system of claim 21, further comprising:
receiving a service authorization response that indicates a level of quota associated with the end user, the quota not released until the end user agrees to pay for the quota.

23. The system of claim 21, a service verification request to the quota server including an identity of the end user and the service or the content that was requested.

24. The system of claim 21, further comprising:
means for communicating a redirect message to the end user, the redirect message generated in response to determining that the end user has not previously agreed to pay for the content or for the service.

25. The system of claim 21, further comprising:
means for sending a redirect message that specifies a location that is sought to be accessed by the end user and an address of a notification server.

26. The system of claim 21, further comprising:
means for receiving an additional redirect message comprising:
the content or the service that was requested by the end user, and
a token indicating that the end user has agreed to proposed billing associated with the content or the service.

27. The system of claim 21, wherein access to the service or to the content is granted for the end user on a per-service basis such that the end user is not queried for subsequent authorizations for the communication session.

28. Software for managing information in a network environment, the software being embodies in a non-transitory computer readable storage medium and comprising computer code such that when executed is operable to:
send, by a content service gateway, one or more service verification service authorization requests corresponding to one or more end user requests by an end user for content or for a service in a communication session, the service verification requests sent to a quota server to request a service verification during which the quota server determines that the end user has agreed to pay for a quota of the service or the content;
inform the quota server of an identity of the end user and the service or the content that is to be billed to the end user via a service authorization;
receive a service verification response from the quota server, the service verification response indicating, the quota and comprising an instruction to stop sending a subsequent service verification request to the quota server;
turn off the service verification in response to the instruction of the service verification response to stop sending a subsequent service verification request to the quota server for service or content in the communication session;
receive at the content service gateway, a second end user request for additional service or content;
determine that the quota covers the additional service or content; and
allow the end user to access the additional service or content according to the second end user request without sending a subsequent request to the quota server for service or content in the communication session.

29. The non-transitory computer readable storage medium of claim 28, wherein the code is further operable to:
receive a service authorization response that indicates a level of quota associated with the end user, the quota not released until the end user agrees to pay for the quota.

30. The non-transitory computer readable storage medium of claim 28, a service verification request to the quota server including an identity of the end user and the service or the content that was requested.

31. The non-transitory computer readable storage medium of claim 28, wherein the code is further operable to:
communicate a redirect message to the end user, the redirect message generated in response to determining that the end user has not previously agreed to pay for the content or for the service.

32. The non-transitory computer readable storage medium of claim 28, wherein the code is further operable to:
send a redirect message that specifies a location that is sought to be accessed by the end user and an address of a notification server.

33. The non-transitory computer readable storage medium of claim 28, wherein the code is further operable to:
receive an additional redirect message comprising:
the content or the service that was requested by the end user, and
a token indicating that the end user has agreed to proposed billing associated with the content or the service.

34. The non-transitory computer readable storage medium of claim 33, wherein access to the service or to the content is granted for the end user on a per-service basis such that the end user is not queried for subsequent authorizations for the communication session.

* * * * *

UNITED STATES PATENT AND TRADEMARK OFFICE
CERTIFICATE OF CORRECTION

| | | |
|---|---|---|
| PATENT NO. | : 8,005,954 B2 | Page 1 of 1 |
| APPLICATION NO. | : 10/928932 | |
| DATED | : August 23, 2011 | |
| INVENTOR(S) | : Robert M. Batz et al. | |

It is certified that error appears in the above-identified patent and that said Letters Patent is hereby corrected as shown below:

Col. 12, Ln. 47: After "the quota" delete "cover" and replace with -- covers --;

Col. 12, Ln. 49: After "second" insert -- end --;

Col. 15, Ln. 29: Delete "embodies" and insert -- embodied --

Signed and Sealed this
Thirteenth Day of December, 2011

David J. Kappos
*Director of the United States Patent and Trademark Office*